(12) United States Patent
Jin (10) Patent No.: US 11,714,455 B2
(45) Date of Patent: Aug. 1, 2023

(54) FLEXIBLE DISPLAY PANEL, DISPLAY DEVICE, AND METHOD FOR CONTROLLING DISPLAY OF DISPLAY DEVICE

(71) Applicant: WUHAN CHINA STAR OPTOELECTRONICS SEMICONDUCTOR DISPLAY TECHNOLOGY CO., LTD., Hubei (CN)

(72) Inventor: Zengjian Jin, Hubei (CN)

(73) Assignee: WUHAN CHINA STAR OPTOELECTRONICS SEMICONDUCTOR DISPLAY TECHNOLOGY CO., LTD., Hubei (CN)

(*) Notice: Subject to any disclaimer, the term of this patent is extended or adjusted under 35 U.S.C. 154(b) by 347 days.

(21) Appl. No.: 17/274,177

(22) PCT Filed: Aug. 31, 2020

(86) PCT No.: PCT/CN2020/112576
§ 371 (c)(1),
(2) Date: Mar. 7, 2021

(87) PCT Pub. No.: WO2022/007152
PCT Pub. Date: Jan. 13, 2022

(65) Prior Publication Data
US 2022/0308628 A1 Sep. 29, 2022

(30) Foreign Application Priority Data

Jul. 6, 2020 (CN) .......................... 202010639731.6

(51) Int. Cl.
*G06F 1/16* (2006.01)
*G06F 1/18* (2006.01)

(52) U.S. Cl.
CPC .......... *G06F 1/1641* (2013.01); *G06F 1/1652* (2013.01); *G06F 1/183* (2013.01)

(58) Field of Classification Search
CPC ...... G06F 1/1641; G06F 1/1652; G06F 1/183; G06F 1/1677; G06F 1/1686; G06F 1/325;
(Continued)

(56) References Cited

U.S. PATENT DOCUMENTS 9,292,114 B2 * 3/2016 Adamson .............. G06F 3/0416
9,317,242 B2 * 4/2016 Shin ..................... G06F 1/1692
(Continued)

FOREIGN PATENT DOCUMENTS

CN 103246315 A 8/2013
CN 105511562 A 4/2016
(Continued)

*Primary Examiner* — Abhishek M Rathod
(74) *Attorney, Agent, or Firm* — PV IP PC; Wei Te Chung; Zhigang Ma (57) ABSTRACT

A flexible display panel, a display device, and a method for controlling display of the display device are provided. The display device includes the flexible display panel. The flexible display panel is a longitudinal foldable screen. A first display part and a second display part are disposed along a longitudinal direction of the flexible display panel. An upper surface of the first display part is configured to display images. The second display part and the first display part are disposed in one body, and the second display part is foldably connected to a top edge of the first display part.

6 Claims, 8 Drawing Sheets

(58) Field of Classification Search
CPC ...... G06F 1/3265; G06F 1/1616; G09F 9/301; G09F 9/302; G09G 3/20
See application file for complete search history.

(56) References Cited

U.S. PATENT DOCUMENTS

| | | | |
|---|---|---|---|
| 9,361,851 B1* | 6/2016 | Basehore | G06F 1/1647 |
| 9,933,819 B2* | 4/2018 | Kim | G06F 3/0412 |
| 10,331,260 B2* | 6/2019 | Evans, V | G06F 1/1637 |
| 10,591,959 B1 | 3/2020 | Hsu et al. | |
| 10,866,694 B2* | 12/2020 | Kim | G06F 3/1446 |
| 2011/0006971 A1* | 1/2011 | Ebey | G06F 3/1423 |
| | | | 345/1.3 |
| 2013/0201101 A1* | 8/2013 | Niu | G06F 1/1677 |
| | | | 345/156 |
| 2014/0049449 A1 | 2/2014 | Park et al. | |
| 2018/0039410 A1* | 2/2018 | Kim | G06F 1/1652 |
| 2018/0159055 A1 | 6/2018 | Namkung | |
| 2019/0018454 A1* | 1/2019 | Jung | G06F 1/1652 |
| 2019/0220061 A1 | 7/2019 | Fujimoto | |
| 2019/0361502 A1* | 11/2019 | Bai | G06F 1/1652 |
| 2020/0203458 A1 | 6/2020 | Jin et al. | |

FOREIGN PATENT DOCUMENTS

| | | |
|---|---|---|
| CN | 106558278 A | 4/2017 |
| CN | 107979668 A | 5/2018 |
| CN | 109686251 A | 4/2019 |
| CN | 209232312 U | 8/2019 |
| CN | 209765371 U | 12/2019 |
| CN | 110675749 A | 1/2020 |
| CN | 209982528 U | 1/2020 |
| CN | 110858461 A | 3/2020 |
| TW | M575877 U | 3/2019 |

* cited by examiner

FLEXIBLE DISPLAY PANEL, DISPLAY DEVICE, AND METHOD FOR CONTROLLING DISPLAY OF DISPLAY DEVICE

BACKGROUND OF INVENTION

Field of Invention

The present disclosure relates to the field of display technology, and particularly to a flexible display panel, a display device, and a method for controlling display of the display device.

Description of Prior Art

With optimization of technology in flexible organic light-emitting diode (OLED) display screens, flexible OLED display screens are used more on products with dynamic folding and dynamic bending features. Large dimensions and high screen-to-body ratios are pursued on screens of mobile phones and tablet computers, while convenient portability and usability also need to be considered. Therefore, mobile phones and tablet computers are bound to evolve to folding types from standard planar types.

Figure 1A:
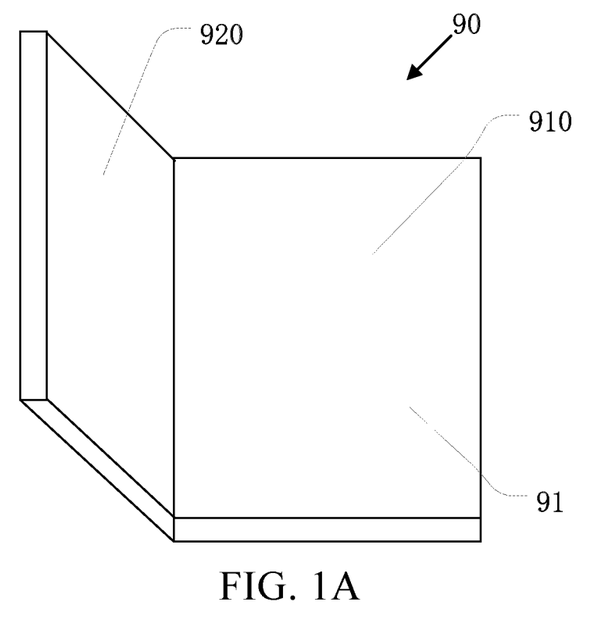
FIG. 1A is a structural schematic diagram of a current transverse foldable screen at a folded angle.
Figure 1B:
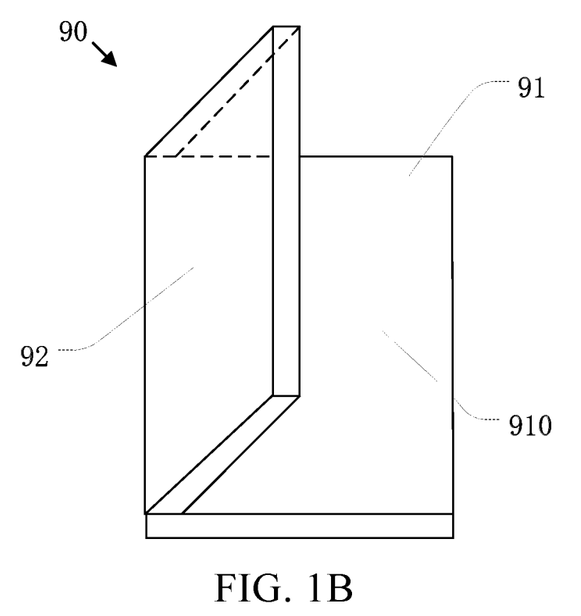
FIG. 1B is a structural schematic diagram of the current transverse foldable screen at another folded angle.

As illustrated in FIG. 1A and FIG. 1B, a transverse foldable screen 90 is shown. An overall machine solution of inward folding is used. A large OLED screen is used as a main screen 91. The main screen 91 includes a main display area 910 and a sub-display area 920. The main display area 910 is folded against the sub-display area 920. A small OLED screen is further disposed on a back surface of the sub-display area 920 to act as a sub-screen 92 for displaying, and the main screen 91 and the sub-screen 92 are two separate OLED screens. After the transverse foldable screen 90 is unfolded, the main display area 910 located on the main display area 91 and the sub-display area 920 display one image together. After the transverse foldable screen 90 is shielded, the main display area 910 and the sub-display area 920 are buckled with each other, the main screen 91 is turned off, and the sub-screen 92 is independently configured to display images. However, the additional sub-screen 92 in this structure makes the system more complicated and leads to significant cost increases.

SUMMARY OF INVENTION

The purpose of the present disclosure is based on characteristics and related technologies of flexible organic light emitting diode (OLED) display screens, that is, using one display screen to fold multi times or double-sided display to realize display of a main screen and a sub-screen in a foldable display device to omit the sub-screen of a transverse foldable screen solution, thereby reducing complexity of the system and reducing cost.

In order to realize the purpose mentioned above, the present disclosure provides a flexible display panel, which is a longitudinal foldable screen. A first display part and a second display part is disposed along a longitudinal direction. An upper surface of the first display part is configured to display images. The second display part is foldably connected to a top edge of the first display part. The second display part includes an inner surface display region and an outer surface display region. After the second display part and the first display part are folded along the longitudinal direction, the inner surface display region of the second display part is folded down to overlap the upper surface of the first display part, and the outer surface display region of the second display part faces up to display images. After the second display part and the first display part are unfolded along the longitudinal direction, the inner surface display region of the second display part and the upper surface of the first display part are configured to display one image together.

Furthermore, the second display part further includes an under-screen camera region disposed on a side of a top edge of the inner surface display region of the second display part. After the second display part and the first display part are unfolded along the longitudinal direction, the under-display camera region is configured to display the images or form a light transmissive region.

Furthermore, a camera and/or an infrared sensor is disposed below the under-screen camera region.

Furthermore, the flexible display panel further includes a flexible circuit board electrically connected to a bottom edge of the first display part or electrically connected to a top edge of the second display part.

Furthermore, the second display part further includes a third display part and a fourth display part which are foldably connected. The third display part is disposed on the inner surface display region of the second display part. The fourth display part is disposed on the outer surface display region of the second display part. After the third display part and the fourth display part are folded along the longitudinal direction, the second display part becomes a U-shape structure. After the third display part and the fourth display part are unfolded along the longitudinal direction, the third display part, and the fourth display part are located on a same plane. The flexible circuit board is electrically connected to a top edge of the fourth display part. After the third display part and the fourth display part are folded along the longitudinal direction, a state of overall machine assembly of the second display part is formed.

Furthermore, the second display part further includes a bending connection part, which is disposed between the third display part and the fourth display part and configured in one body with the third display part and the fourth display part. After the third display part, the bending connection part, and the fourth display part are unfolded along the longitudinal direction, the third display part, the bending connection part, and the fourth display part are located on the same plane. After the bending connection part is bent, it can be an arc structure or kept in a plane structure. The bending connection part can be a display region or a non-display region.

Furthermore, the second display part includes a two-way display region disposed in a middle section of the second display part. One side of the two-way display region is the inner surface display region of the second display part, and another side is the outer surface display region of the second display part.

A material of indium tin oxide is used in anodes of a pixel circuit of the two-way display region.

After the second display part and the first display part are unfolded along the longitudinal direction, a side of the inner surface display region in the two-way display region is configured to display images. After the second display part and the first display part are folded along the longitudinal direction, a side of the outer surface display region in the two-way display region is configured to display images.

Furthermore, the second display part further includes a liquid crystal dimming screen, which is disposed on the outer surface display region of the second display part, covers the two-way display region, is configured to turn off to form a black screen when the second display part and the first display part are unfolded along the longitudinal direction, and forms a light transmissive screen when the second display part and the first display part are folded along the longitudinal direction.

The present disclosure further provides a display device including the flexible display panel mentioned above.

Furthermore, the display device further includes a first housing, a second housing, and a screen bending sensor. An upper surface of the first housing is configured to mount the first display part. A second housing is configured to mount the second display part. A screen bending sensor is configured to detect an unfolded state or a folded state of the second display part relative to the first display part.

The present disclosure further provides a method for controlling display of the display device, which is used to control the display device mentioned above to display and includes steps:

a step of detecting a display device state: detecting an unfolded state or a folded state of the second display part relative to the first display part by a screen bending sensor;

a display control step: starting the first display part and the inner surface display region of the second display part to display the images and keeping the outer surface display region of the second display part turned off, when the display device is in the unfolded state; and starting the outer surface display region of the second display part to display the images and keeping the first display part and the inner surface display region of the second display part turned off, when the display device is in the folded state;

a step of controlling the under-screen camera region: detecting whether the under-screen camera region is started when the display device is in the unfolded state; configuring the under-screen camera region to display the images when the under-screen camera region is not started; controlling the under-screen camera region to form a light transmissive region when the under-screen camera region is started; and a step of controlling a power supply mode: keeping the first display part and the inner surface display region of the second display part turned off, keeping the outer surface display region of the second display part sleeping, or performing always on display on the outer surface display region of the second display part, when a power supply is turned off.

The beneficial effect of the present disclosure is that the present disclosure provides the flexible display panel, the display device, and the method for controlling the display of the display device, and by the configuration solution of disposing the first display part and the second display part into one body along the longitudinal direction and folding one display screen to multiple times or through double-sided display, the purpose of display by the main screen and the sub-screen in the foldable display device is realized. By using this solution, there is no need to dispose a sub-screen independently, which can reduce complexity of the system and can reduce manufacturing cost and is conducive to mass production and mass sales.

The reference numbers of components in the drawings as follows:
1, under-screen camera region; 2, two-way display region;
10, first display part;
20, second display part; 21, inner surface display region;
22, outer surface display region;
23, liquid crystal dimming screen; 30, flexible circuit board;
100, flexible display panel;
210, third display part; 220, fourth display part; 230, bending connection part.

DETAILED DESCRIPTION OF EMBODIMENTS

The descriptions of embodiments below refer to accompanying drawings in order to illustrate certain embodiments which the present disclosure can implement. The directional terms of which the present disclosure mentions, for example, "top," "bottom," "upper," "lower," "front," "rear," "left," "right," "inside," "outside," "side," "transverse" etc., are just refer to directions of the accompanying figures. Therefore, the used directional terms are for illustrating and understanding the present disclosure, but not for limiting the present disclosure. In the figures, units with similar structures are indicated by the same reference numerals.

In the drawings, the thicknesses of layers and regions are exaggerated for clarity. For example, for ease of description, the dimensions and thickness of each component shown in the drawings are arbitrarily shown, and the present disclosure does not limit the dimensions and thickness of each component.

First Embodiment

Please refer to FIG. 2, FIG. 3, FIG. 4, and FIG. 5, in the first embodiment, a flexible display panel 100 is provided, which is a longitudinal foldable screen. A first display part 10 and a second display part 20 is disposed along a longitudinal direction of the flexible display panel 100. The first display part 10 acts as a relative fixing part, and an upper surface of the first display part 10 is configured to display images. The second display part 20 is foldably connected to a top edge of the first display part 10. Preferably, the second display part 20 and the first display part 10 are configured in one body. The second display part 20 includes an inner surface display region 21 correspondingly disposed with the first display part 10 and an outer surface display region 22 connected with the inner surface display region 21.

Figure 2:
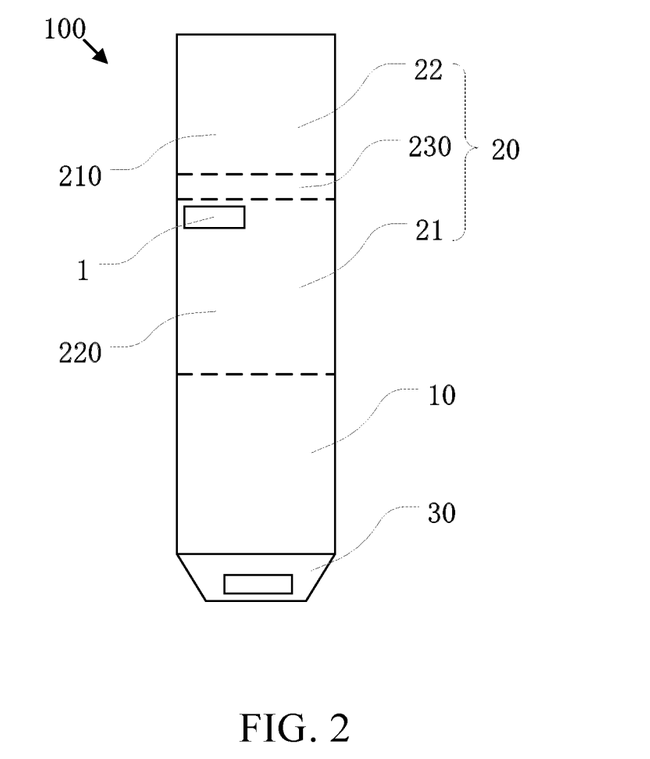
FIG. 2 is a structural schematic diagram of a completely unfolded plane of a first display part and a second display part of a flexible display panel in a first embodiment of the present disclosure.

As illustrated in FIG. 2, which is a structural schematic diagram of completely unfolded plane first display part 10 and the second display part 20 of the flexible display panel 100.

The upper surface of the first display part 10 and the inner surface display region 21 and the outer surface display region 22 of the second display part 20 are located on a same plane.

Figure 3:
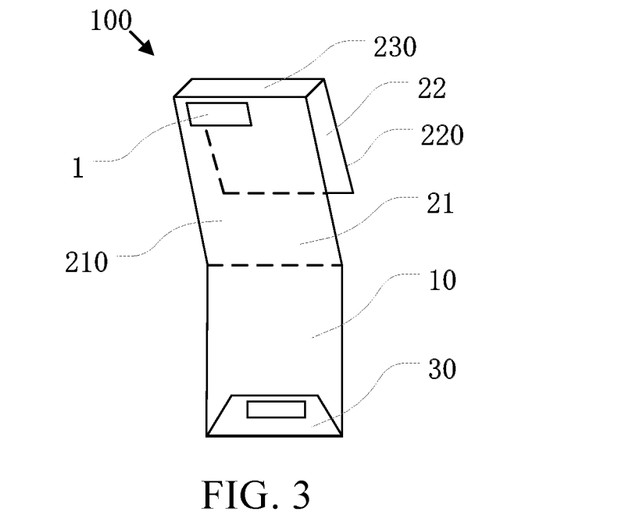
FIG. 3 is a structural schematic diagram of an assembling state of the flexible display panel in the first embodiment of the present disclosure.

As illustrated in FIG. 3, which is a structural schematic diagram of an assembling state of the flexible display panel 100. The second display part 20 thereof is a U-shape structure. The inner surface display region 21 and the outer surface display region 22 of the second display part 20 form the U-shape structure. The structure of FIG. 3 is from folding the structure illustrated in FIG. 2. FIG. 2 is a completely manufactured unfolded structure, and FIG. 3 is a bending structure for assembling.

Figure 4:
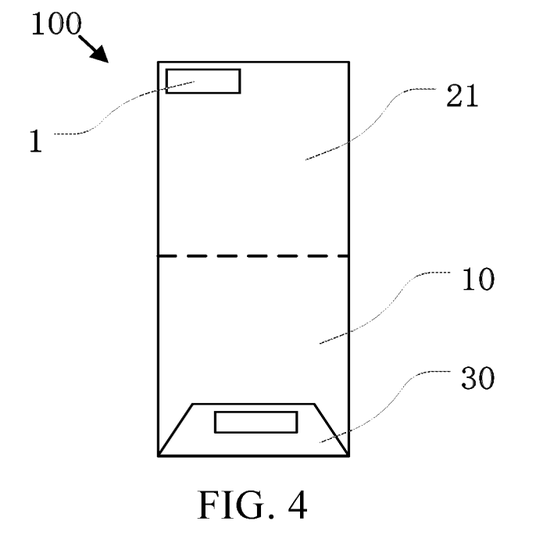
FIG. 4 is a structural schematic diagram of the flexible display panel in the first embodiment of the present disclosure in an unfolded state.

As illustrated in FIG. 4, which is a structural schematic diagram of the flexible display panel when used in an unfolded state; that is, after the second display part 20 and the first display part 10 are unfolded along the longitudinal direction, the inner surface display region 21 of the second display part 20 and the upper surface of the first display part 10 are configured to display one image together. Of course, if it is necessary, the inner surface display region 21 of the second display part 20 and the upper surface of the first display part 10 can display different images separately.

Figure 5:
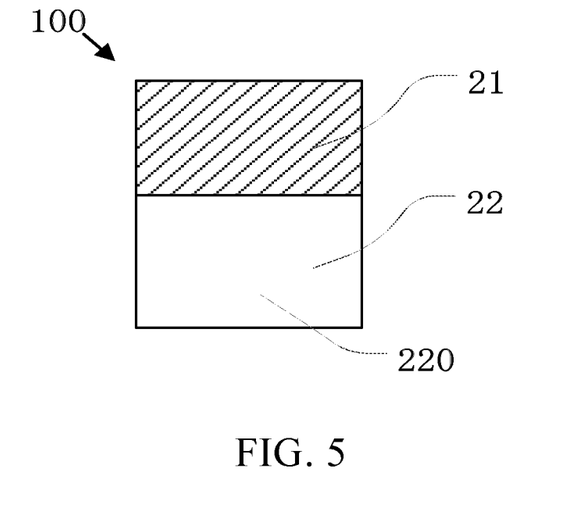
FIG. 5 is a structural schematic diagram of the flexible display panel in the first embodiment of the present disclosure in a folded state.
Figure 6:
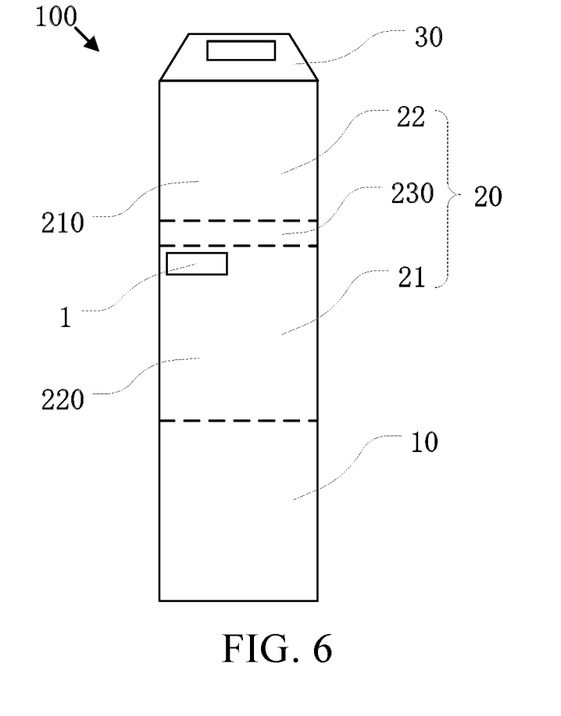
FIG. 6 is a structural schematic diagram of a completely unfolded plane of the first display part and the second display part of the flexible display panel in a second embodiment of the present disclosure.
Figure 7:
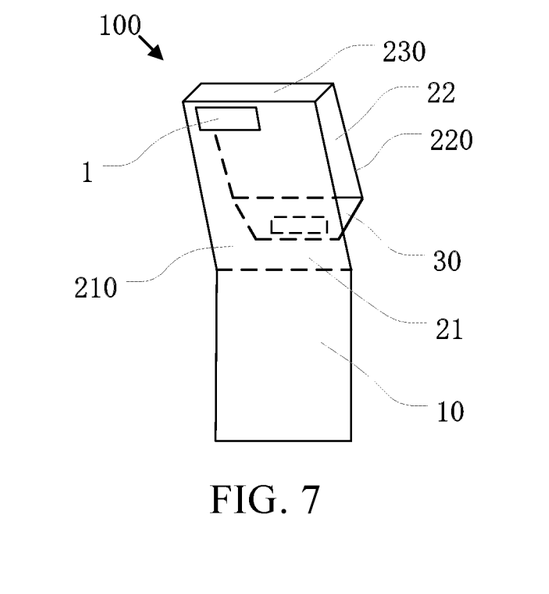
FIG. 7 is a structural schematic diagram of an assembling state of the flexible display panel in the second embodiment of the present disclosure.
Figure 8:
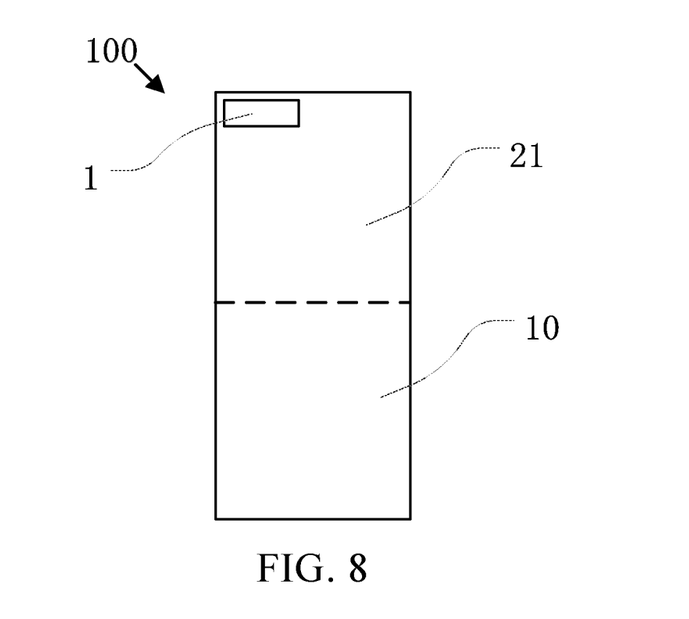
FIG. 8 is a structural schematic diagram of the flexible display panel in the second embodiment of the present disclosure in an unfolded state.

As illustrated in FIG. 5, which is a structural schematic diagram of the flexible display panel 100 when used after being folded; that is, after the second display part 20 and the first display part 10 are folded along the longitudinal direction, the inner surface display region 21 of the second display part 20 is folded down to overlap the upper surface of the first display part 10, and the outer surface display region 22 of the second display part 20 faces up to display images. Preferably, shapes and dimensions of the inner surface display region 21 of the second display part 20 and the upper surface of the first display part 10 are same.

As illustrated in FIG. 2 to FIG. 4, in this embodiment, the second display part 20 further includes an under-screen camera region 1 disposed on a side of a top edge of the inner surface display region 21 of the second display part 20. After the second display part 20 and the first display part 10 are unfolded along the longitudinal direction, the under-display camera region 1 is configured to display the images or form a light transmissive region.

In this embodiment, a camera and/or an infrared sensor is disposed below the under-screen camera region 1.

As illustrated in FIG. 2 to FIG. 4, in this embodiment, the flexible display panel 100 further includes the flexible circuit board 30 electrically connected to an upper edge of the first display part 10.

In this embodiment, the second display part 20 further includes a third display part 210 and a fourth display part 220 which are foldably connected. The third display part 210 is disposed on the inner surface display region 21 of the second display part 20. The fourth display part 220 is disposed on the outer surface display region 22 of the second display part 20. Preferably, the third display part 210 and the fourth display part 220 are configured as one body. After the third display part 210 and the fourth display part 220 are folded along the longitudinal direction, the second display part 20 becomes a U-shape structure. After the third display part 210 and the fourth display part 220 are unfolded along the longitudinal direction, the third display part 210 and the fourth display part 220 are located on a same plane. As illustrated in FIG. 2, during manufacturing, the third display part 210 and the fourth display part 220 are located on a same plane, and the third display part 210 and the fourth display part 220 are unfolded along the longitudinal direction. As illustrated in FIG. 3, after manufacturing is completed, the second display part 20 are formed into the U-shape structure by the third display part 210 and the fourth display part 220 being bent; that is, after the third display part 210 and the fourth display part 220 are folded along the longitudinal direction, the inner surface display region 21 and the outer surface display region 22 of the second display part 20 form the U-shape structure to form a state of overall machine assembly of the second display part 20.

As illustrated in FIG. 2 and FIG. 3, in this embodiment, the second display part 20 further includes a bending connection part 230, which is disposed between the third display part 210 and the fourth display part 220 and is configured in one body with the third display part 210 and the fourth display part 220. After the third display part 210, the bending connection part 230, and the fourth display part 220 are unfolded along the longitudinal direction, the third display part 210, the bending connection part 230, and the fourth display part 220 are located on the same plane. After the bending connection part 230 is bent, it can be an arc structure or maintain a plane structure. The bending connection part 230 can be a display region or a non-display region.

Second Embodiment

Please refer to FIG. 6, FIG. 7, FIG. 8, and FIG. 9, the second embodiment 2 includes most of technical features of the first embodiment. The difference between them is that the flexible circuit board 30 of the second embodiment is electrically connected to a top edge of the second display part 20, but not as the flexible circuit board 30 of the first embodiment electrically connected to the bottom edge of the first display part 10. Specifically, the flexible circuit board 30 is electrically connected to a top edge of the fourth display part 220.

Figure 9:
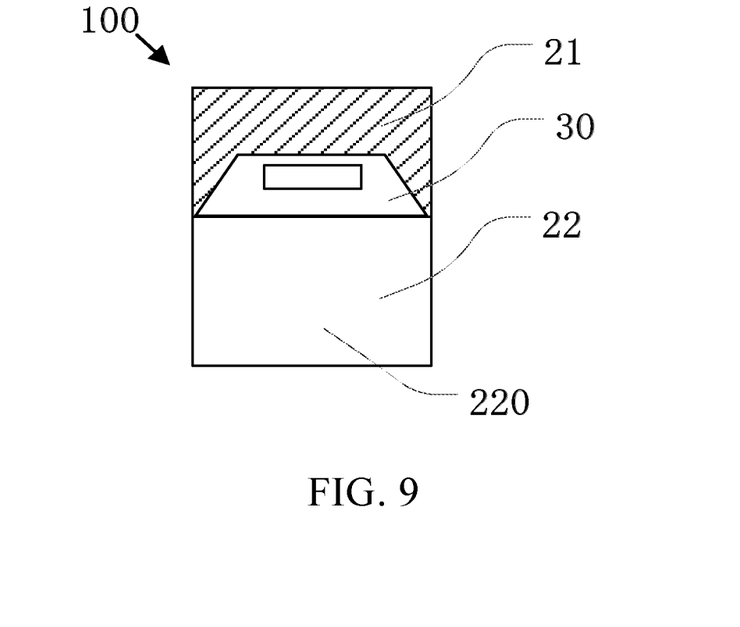
FIG. 9 is a structural schematic diagram of the flexible display panel in the second embodiment of the present disclosure in a folded state.
Figure 10:
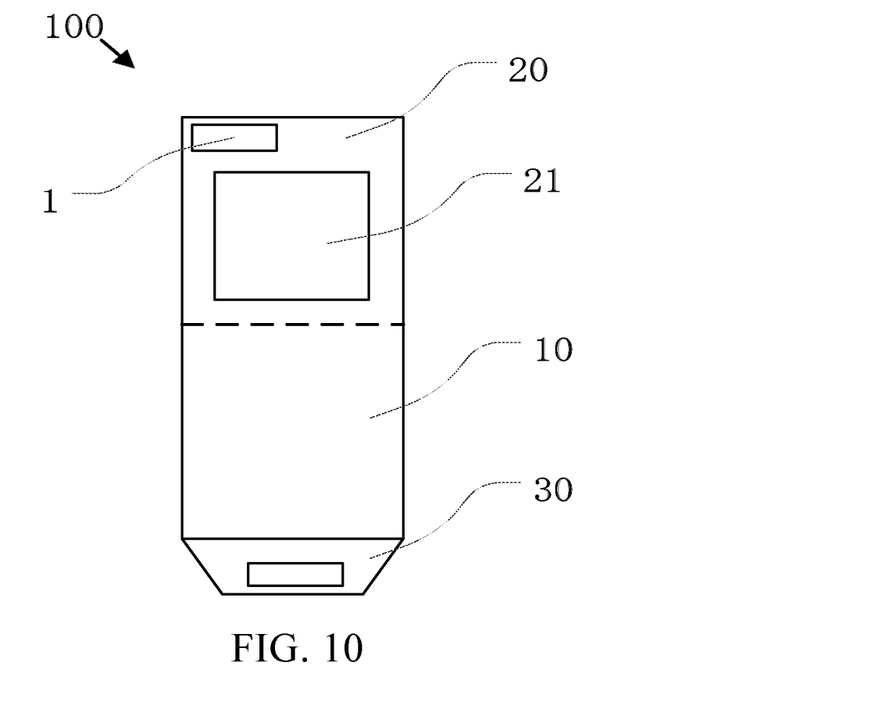
FIG. 10 is a structural schematic diagram of a completely unfolded plane of the first display part and the second display part of the flexible display panel in a third embodiment of the present disclosure.
Figure 11:
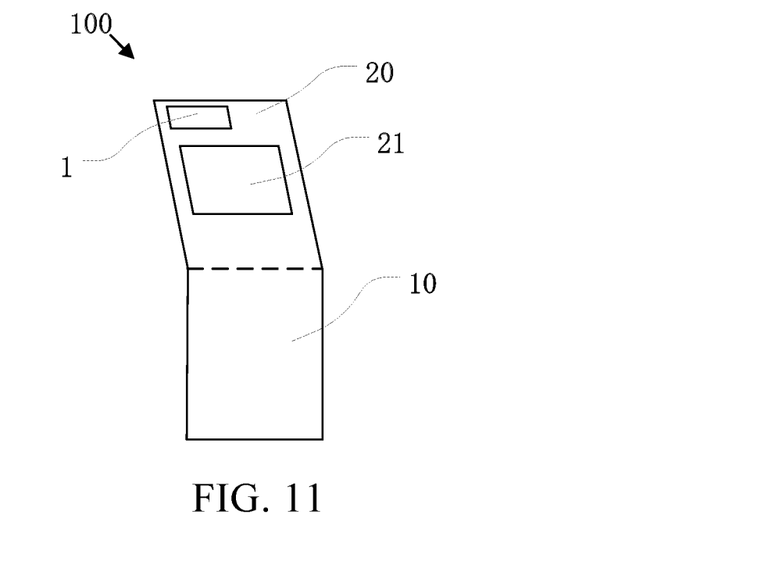
FIG. 11 is a structural schematic diagram of an assembling state of the flexible display panel in the third embodiment of the present disclosure.
Figure 12:
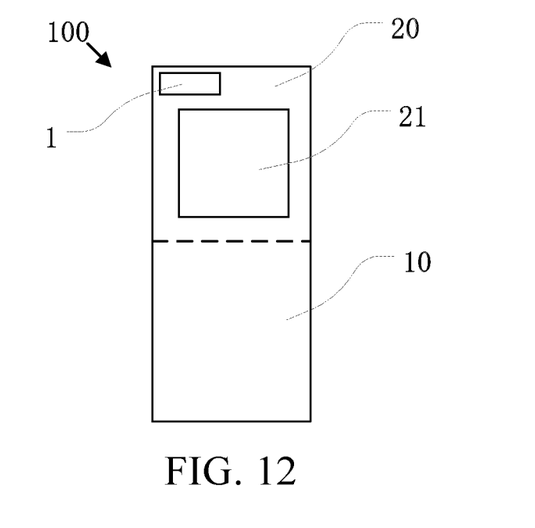
FIG. 12 is a structural schematic diagram of the flexible display panel in the third embodiment of the present disclosure in an unfolded state.
Figure 13:
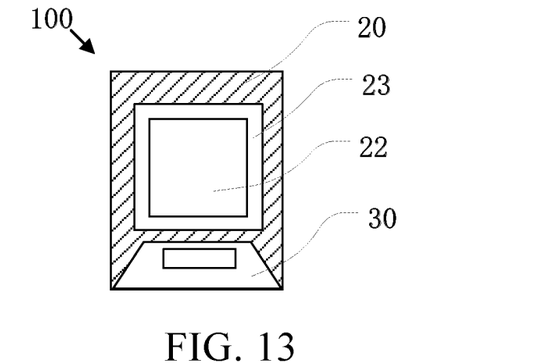
FIG. 13 is a structural schematic diagram of the flexible display panel in the third embodiment of the present disclosure in a folded state.

As illustrated in FIG. 9, the flexible circuit board 30 can be disposed on a side of the outer surface display region 22 of the second display part 20 after the display panel 100 is folded. Preferably, a length of the fourth display part 220 along the longitudinal direction is less than a length of the third display part 210 along the longitudinal direction. More preferably, a sum of the lengths of the fourth display part 220 and the flexible circuit board 30 along the longitudinal direction is less than the length of the third display part 210 along the longitudinal direction. This configuration can reduce space occupied by the flexible circuit board 30 to realize a technical effect of narrow bezels.

Third Embodiment

Please refer to FIG. 10, FIG. 11, FIG. 12, and FIG. 13, the third embodiment includes most of the technical features of the first embodiment. The difference between them is that there is difference between the structures of the second display part 20 of the third embodiment and the second display part 20 of the first embodiment. In the third embodiment, the bending connection part 230 of the first embodiment does not need to be disposed, and the second display part 20 does not need to be disposed as a U-shape structure; that is, there is no need to dispose the inner surface display region 21 and the outer surface display region 22 of the second display part 20 to form the U-shape structure. Rather, the third display part 210 and the fourth display part 220 are configured to be in one body to act as a two-way display region 2, which reduces an overall unfolded length of the second display part 20 along the longitudinal direction.

In this embodiment, the second display part 20 includes the two-way display region 2. The two-way display region 2 is disposed in a middle section of the second display part 20. One side of the two-way display region 2 is the inner surface display region 21 of the second display part 20, and another side is the outer surface display region 22 of the second display part 20. A material of indium tin oxide, but not a metal material, can realize luminescence on two ways, which is used in anodes of a pixel circuit of the two-way display region 2. After the second display part 20 and the first display part 10 are unfolded along the longitudinal direction, the side of the inner surface display region 211 in the two-way display region 21 is configured to display images. After the second display part 20 and the first display part 10 are folded along the longitudinal direction, the side of the outer surface display region 22 in the two-way display region 2 is configured to display images. The side of the inner surface display region 21 in the two-way display region 2 and the first display part 10 do not display images. At this time, a partial display mode (Partial Mode) can be used in the two-way display region 20 to display normally, and an always-on-display mode (AOD Mode) can also be used to display information. Because sequence of displayed contents of the inner surface display region 21 and the outer surface display region 22 of the two-way display regions are different during unfolded and folded states, data of these regions should be inverted during transformation from the unfolded state to semi-folded and folded states.

Because user information may be leaked from the two-way display region 2 during use in the unfolded state, the second display part 20 of this embodiment further includes a liquid crystal dimming screen 23. The liquid crystal dimming screen 23 is disposed on the outer surface display region 22 of the second display part 20, covers the two-way display region 2, is configured to turn off to form a black screen when the second display part 20 and the first display part 10 are unfolded along the longitudinal direction, and forms a light transmissive screen when the second display part 20 and the first display part 10 are folded along the longitudinal direction. Specifically, the liquid crystal dimming screen 23 is turned off during unfolded and displaying. Light cannot penetrate the side of the outer surface display region 22 from the two-way display region 2. The liquid crystal dimming screen 23 is turned on during folded displaying. The light of the two-way display region 2 can penetrate the liquid crystal dimming screen 23, and displayed information can be read by users normally.

The present disclosure further provides a display device including the flexible display panel 100 mentioned above. The display device 100 in this embodiment can be any products or components having display functions, such as wearable devices, mobile phones, tablet computers, televisions, display devices, laptops, e-books, e-newsletters, digital photo frames, global positioning systems, etc. Furthermore, the wearable devices include smart bracelets, smartwatches, virtual reality (VR) devices, etc.

In this embodiment, the display device further includes a first housing, a second housing, and a screen bending sensor. The first housing acts as a main fixing part, and an upper surface of the first housing is configured to mount the first display part 10. The second housing is configured to mount the second display part 20. The screen bending sensor is configured to detect an unfolded state or a folded state of the second display part 20 relating to the first display part 10.

Figure 14:
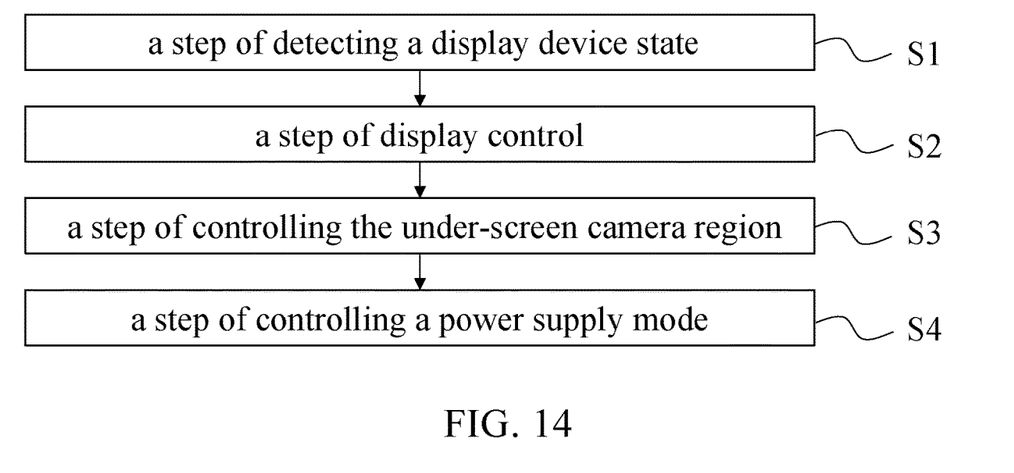
FIG. 14 is a flowchart of a method of controlling a display device in an embodiment of the present disclosure.

Please refer to FIG. 14, the present disclosure further provides a control method of the display device mentioned above, including following steps:

S1, a step of detecting a display device state: detecting an unfolded state or a folded state of the second display part 20 relating to the first display part 10 by a screen bending sensor;

S2, a step of display control: starting the first display part 10 and the inner surface display region 21 of the second display part 20 to display the images and keeping the outer surface display region 22 of the second display part 20 turned off, when the display device is in the unfolded state; and starting the outer surface display region 22 of the second display part 20 to display the images and keeping the first display part 10 and the inner surface display region 21 of the second display part 20 turned off when the display device is in the folded state;

S3, a step of controlling the under-screen camera region: detecting whether the under-screen camera region 1 is started when the display device is in the unfolded state; configuring the under-screen camera region 1 to display the images when the under-screen camera region 1 is not started; controlling the under-screen camera region 1 to form a light transmissive region when the under-screen camera region 1 is started; and S4, a step of controlling a power supply mode: preferably, keeping the first display part 10 and the inner surface display region 21 of the second display part 20 turned off, keeping the outer surface display region 22 of the second display part 20 sleeping, or performing always on display on the outer surface display region 22 of the second display part 20 when a power supply is turned off. It can be understood that when the display device is in the unfolded state, the step S4 of controlling the power supply modes can also be realized.

Wherein, the step S3 of controlling the under-screen camera region 1 does not relate to the step S4 of controlling the power supply mode, and there are no strict restrictions on the order.

The beneficial effect of the present disclosure is that the present disclosure provides the flexible display panel, the display device, and the method for controlling the display of the display device, and by the configuration solution of disposing the first display part and the second display part into one body along the longitudinal direction and folding one display screen to multiple times or through double-sided display, the purpose of display by the main screen and the sub-screen in the foldable display device is realized. By using this solution, there is no need to dispose a sub-screen independently, which can reduce complexity of the system and can reduce manufacturing cost and is conducive to mass production and mass sales.

The above-mentioned embodiments demonstrate some embodiment means of the present disclosure, and are described in details and in specific, but should not restrict the scope of the present disclosure. It should be noted that without departing from the conception of the present disclosure, those skilled in the art may be able to make transformation and improvement of the present disclosure within the scope. Therefore, the scope of the present disclosure is defined by the claims.

What is claimed is:

1. A flexible display panel, wherein the flexible display panel is a longitudinal foldable screen comprising following disposed along a longitudinal direction:
    a first display part, wherein an upper surface thereof is configured to display images; and
    a second display part foldably connected to a top edge of the first display part, wherein the second display part comprises an inner surface display region and an outer surface display region;
    wherein, after the second display part and the first display part are folded along the longitudinal direction, the inner surface display region of the second display part is folded down to overlap the upper surface of the first display part, and the outer surface display region of the second display part faces up to display images; after the second display part and the first display part are unfolded along the longitudinal direction, the inner surface display region of the second display part and the upper surface of the first display part are configured to display one image together;
    wherein the second display part comprises:
    a two-way display region disposed in a middle section of the second display part, wherein one side of the two-way display region is the inner surface display region of the second display part, and another side is the outer surface display region of the second display part, and
    wherein after the second display part and the first display part are unfolded along the longitudinal direction, a side of the inner surface display region in the two-way display region is configured to display images; and after the second display part and the first display part are folded along the longitudinal direction, a side of the outer surface display region in the two-way display region is configured to display images;
    wherein the second display part comprises: a liquid crystal dimming screen, disposed on the outer surface display region of the second display part, covering the two-way display region and configured to turn off to form a black screen when the second display part and the first display part are unfolded along the longitudinal direction and forming a light transmissive screen when the second display part and the first display part are folded along the longitudinal direction.

2. The flexible display panel as claimed in claim 1, wherein the second display part comprises:
    an under-screen camera region disposed on a side of a top edge of the inner surface display region of the second display part, wherein after the second display part and the first display part are unfolded along the longitudinal direction, the under-display camera region is configured to display the images or form a light transmissive region.

3. A display device, comprising the flexible display panel as claimed in claim 2.

4. The display device as claimed in claim 3, wherein the display device comprises:
    a first housing, wherein an upper surface of the first housing is configured to mount the first display part;
    a second housing configured to mount the second display part; and
    a screen bending sensor configured to detect an unfolded state or a folded state of the second display part relative to the first display part.

5. A method for controlling display of a display device configured to control the display device as claimed in claim 3 to display, comprising:
    detecting an unfolded state or a folded state of the second display part relative to the first display part by a screen bending sensor;
    starting the first display part and the inner surface display region of the second display part to display the images and keeping the outer surface display region of the second display part turned off, when the display device is in the unfolded state; and starting the outer surface display region of the second display part to display the images and keeping the first display part and the inner surface display region of the second display part turned off, when the display device is in the folded state;
    detecting whether the under-screen camera region is started when the display device is in the unfolded state; configuring the under-screen camera region to display the images when the under-screen camera region is not started; controlling the under-screen camera region to form a light transmissive region when the under-screen camera region is started; and
    keeping the first display part and the inner surface display region of the second display part turned off, keeping the outer surface display region of the second display part sleeping, or performing always on display on the outer surface display region of the second display part, when a power supply is turned off.

6. The flexible display panel as claimed in claim 1, wherein the flexible display panel comprises:
    a flexible circuit board electrically connected to a bottom edge of the first display part or electrically connected to a top edge of the second display part.

* * * * *